United States Patent
Sugai (10) Patent No.: US 8,576,419 B2
(45) Date of Patent: Nov. 5, 2013

(54) IMAGE READING DEVICE AND IMAGE FORMING APPARATUS FOR DETECTING THAT DOCUMENT READING UNIT IS POSITIONED AT DOCUMENT REFERENCE LINE

(75) Inventor: Atsushi Sugai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 175 days.

(21) Appl. No.: 13/137,376

(22) Filed: Aug. 10, 2011

(65) Prior Publication Data

US 2012/0044514 A1 Feb. 23, 2012

(30) Foreign Application Priority Data

Aug. 23, 2010 (JP) .................. 2010-186149

(51) Int. Cl.
*G06K 15/02* (2006.01)
(52) U.S. Cl.
USPC ........................................ 358/1.13; 358/474
(58) Field of Classification Search
USPC ................................. 358/1.13, 474
See application file for complete search history.

(56) References Cited

U.S. PATENT DOCUMENTS

| 2007/0279709 A1 | 12/2007 | Yamada | |
| 2009/0168121 A1* | 7/2009 | Tsujimoto et al. | 358/474 |
| 2009/0180158 A1* | 7/2009 | Suto | 358/474 |

FOREIGN PATENT DOCUMENTS

| EP | 1 326 420 | 7/2003 |
| EP | 2 091 223 | 8/2009 |
| JP | 2006010718 A | 1/2006 |
| JP | 2007324969 A | 12/2007 |
| JP | 2009206623 A | 9/2009 |

OTHER PUBLICATIONS

European Search Report dated Nov. 25, 2011 issued in corresponding European Application No. 11177585.4.

* cited by examiner

*Primary Examiner* — Qian Yang (74) *Attorney, Agent, or Firm* — Harness, Dickey & Pierce (57) ABSTRACT

An image reading device that can be incorporated in an image forming apparatus includes a housing including a first housing member having a document reading area and a second housing member attached to the first housing member, a document reading unit disposed inside the housing to read a document while moving in a sub-scanning direction of the housing, a document reference line formed on the first housing member to position the document placed on the document reading area in the sub-scanning direction, and a reference position detector positioned on a plane surface of a square that extends perpendicular to the document reading area along a main scanning direction of the document reference line to detect a reference position of the document reading unit as the document reading unit moves in the sub-scanning direction.

11 Claims, 4 Drawing Sheets

IMAGE READING DEVICE AND IMAGE FORMING APPARATUS FOR DETECTING THAT DOCUMENT READING UNIT IS POSITIONED AT DOCUMENT REFERENCE LINE

CROSS-REFERENCE TO RELATED APPLICATIONS

This patent application is based on and claims priority pursuant to 35 U.S.C. §119 to Japanese Patent Application No. 2010-186149, filed on Aug. 23, 2010 in the Japan Patent Office, the entire disclosure of which is hereby incorporated herein by reference.

FIELD OF THE INVENTION

Embodiments of the present invention relate to an image reading device and an image forming apparatus incorporating the image reading device, and more particularly, to an image reading device such as a scanner including an image position detector to detect a reference position of an image reading unit when the image reading unit is moving, and an image forming apparatus such as a copier, facsimile machine and so forth, incorporating the image reading device.

BACKGROUND OF THE INVENTION

Related-art image forming apparatuses such as copiers, facsimile machines, and printers include a scanner that serves as an image reading device that employs a scanning unit or an image reading unit to read image of a document. In the scanning unit, while a moving member that is driven by a stepping motor is moving along a reading object surface of the document placed on a contact glass, a light source of the moving member emits a light beam via the contact glass onto the reading object surface of the document. Then, the scanner unit directs the light beam reflected by the reading object surface of the document to an image sensor to read the image formed on the reading object surface of the document in a sub-scanning direction, which is a direction of movement of the moving member of the scanner unit.

As the moving member moves, it starts reading the image of the document using as a reference a home position that is a stop position. Therefore, the image reading device includes a position sensor such as a photo interrupter to detect the position of the moving member. When the moving member is detected by the home position sensor, the moving member is stopped by the stepping motor at the home position, which is a predetermined distance from the home position sensor, to stand by.

Then, when a scan of the document is required by a central processing unit (CPU), the stepping motor moves the moving member to a reading start position in the sub-scanning direction using as a reference the home position and starts scanning the document (as discloses, for example, in Japanese Patent Application Publications Nos. 2009-206623 and 2006-010718.)

Generally, a home position sensor is attached to the housing of the image reading device, with the document positioned at one end of the contact glass, which is mounted on the housing. This one end of the contact glass where the document is positioned in the sub-scanning direction is the reading start position of the document. Conventionally, a distance from the home position to the reading start position is managed by pulse signals output by the stepping motor, and thus it is necessary that the home position sensor detect the document accurately.

However, with the home position sensor attached to the housing and the positioning of the document set to the one end of the contact glass in the sub-scanning direction thereof, in a case in which the pulse signals output by the stepping motor manage the distance from the home position to the reading start position, if the housing undergoes thermal expansion or contraction, the relative positions of the reading start position and the home position in the sub-scanning direction also change.

In this case, the reading start position with respect to the home position based on the position of the moving member as detected by the home position sensor deviates from the correct reading start position. Consequently, the reading start position of the image is deviated by the amount of deviation of the reading start position, and as a result, the image reading accuracy deteriorates.

BRIEF SUMMARY OF THE INVENTION

The present invention describes a novel image reading device. In one example, a novel image reading device includes a housing, a document reading unit, a document reference line, and a reference position detector. The housing includes a planar first housing member having a document reading area on which a document is placed and a rectangular second housing member attached to the first housing member. The document reading unit is disposed inside the housing to read the document through the document reading area while moving in a sub-scanning direction. The document reference line is formed on the first housing member to position the document placed on the document reading area in the sub-scanning direction. The reference position detector is positioned on a plane surface of a square that extends perpendicular to the document reading area along a main scanning direction of the document reference line to detect a reference position of the document reading unit as the document reading unit moves in the sub-scanning direction.

The above-described image reading device may further include a first fixing unit to fix the first housing member and the second housing member in the main scanning direction of the document reference line.

The above-described image reading device may further include a second fixing unit disposed a predetermined distance from the first fixing unit in the sub-scanning direction. The second fixing unit may fix the first housing member and the second housing member to allow the first housing member and the second housing member to deform in the sub-scanning direction.

The reference position detector may be mounted on the second housing member.

The reference position detector may be mounted on the first housing member.

The first housing member and the second housing member may be made of the same material.

The present invention further describes a novel image forming apparatus. In one example, a novel image forming apparatus includes the above-described image reading device, and an image forming unit to form the image read by the image reading device on a recording medium.

BRIEF DESCRIPTION OF THE SEVERAL VIEWS OF THE DRAWINGS

A more complete appreciation of the invention and many of the advantages thereof are obtained as the same becomes better understood by reference to the following detailed description when considered in connection with the accompanying drawings, wherein.

DETAILED DESCRIPTION OF THE INVENTION

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to the present invention. Elements having the same functions and shapes are denoted by the same reference numerals throughout the specification and redundant descriptions are omitted. Elements that do not require descriptions may be omitted from the drawings as a matter of convenience. Reference numerals of elements extracted from the patent publications are in parentheses so as to be distinguished from those of exemplary embodiments of the present invention.

The present invention includes a technique applicable to any image forming apparatus, and is implemented in the most effective manner in an electrophotographic image forming apparatus.

In describing preferred embodiments illustrated in the drawings, specific terminology is employed for the sake of clarity. However, the disclosure of the present invention is not intended to be limited to the specific terminology so selected and it is to be understood that each specific element includes all technical equivalents that operate in a similar manner.

Referring now to the drawings, wherein like reference numerals designate identical or corresponding parts throughout the several views, preferred embodiments of the present invention are described.

Referring to drawings, descriptions will be given of embodiments of the present invention.

[Embodiment 1]

FIGS. 1 through 6 illustrate schematic configurations of an image reading device and an electrophotographic image forming apparatus according to Embodiment 1 of the present invention. The descriptions are given of the image forming apparatus including the image reading device such as a scanner. In Embodiment 1, the image forming apparatus corresponds to a copier 1 but is not limited thereto. For example, the image forming apparatus can be a facsimile machine, multifunctional machine including functions of facsimile machine and copier, or any other image forming apparatus.

Figure 1:
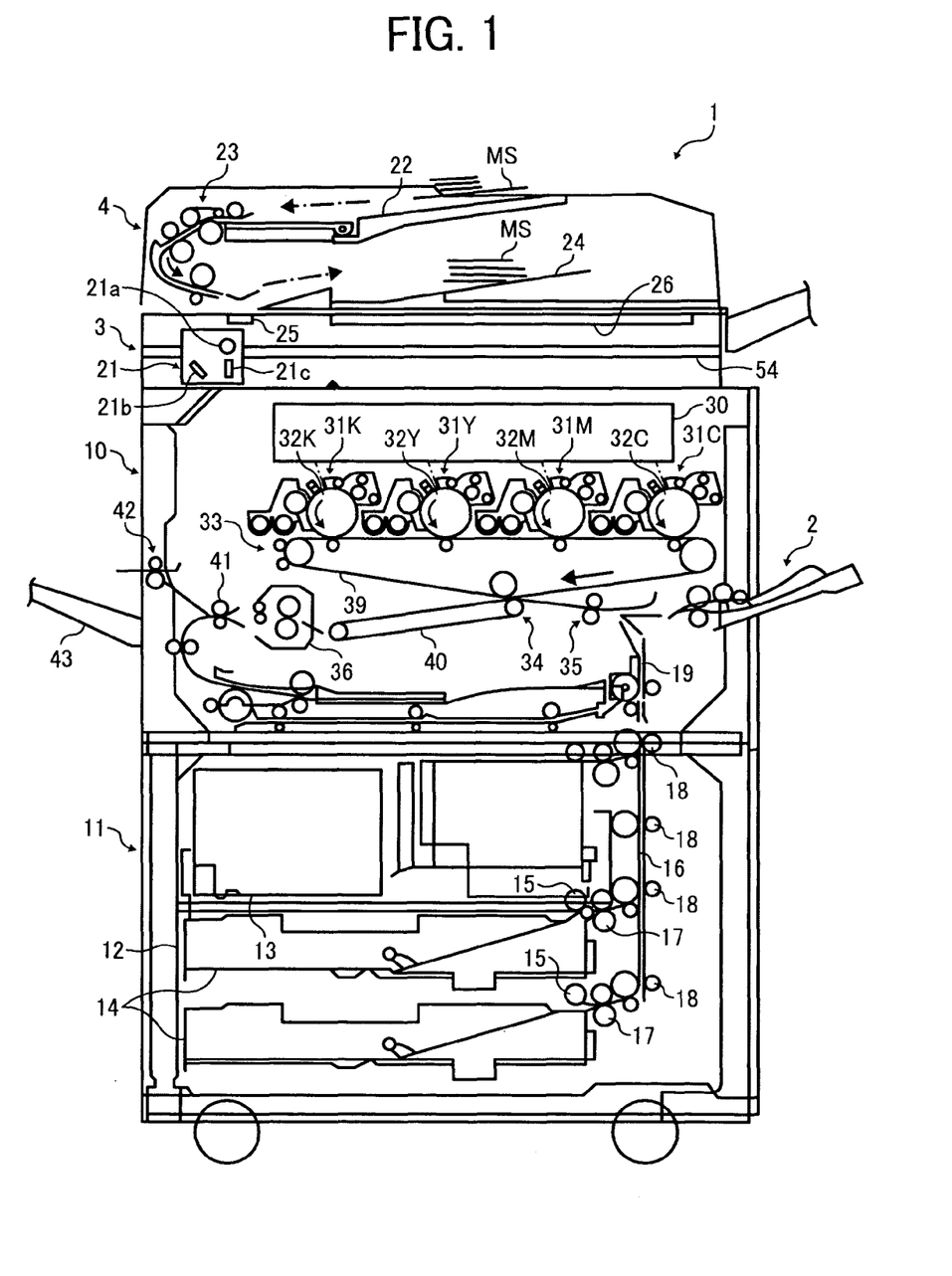
FIG. 1 is a diagram illustrating a schematic configuration of a copier serving as an image forming apparatus according to Embodiment 1 of the present invention.

In FIG. 1, the copier 1 that serves as an image forming apparatus includes a printer unit 2, a scanner unit 3 that serves as an image reading device, and an ADF (Automatic Document Feeder) 4.

The printer unit 2 includes a printer main body 10 and a sheet feeding unit 11. The scanner unit 3 is fixedly mounted on an upper portion of the printer unit 2, and the ADF 4 is fixedly mounted on an upper portion of the scanner unit 3.

The sheet feeding unit 11 includes a paper bank 12, sheet feeding cassettes 13 and 14 that are disposed one above another in a vertical direction in the paper bank 12, a sheet feeding roller 15 that feeds a recording medium (i.e., a sheet or a sheet-like paper) from the sheet feeding cassettes 13 and 14, a separation roller 17 that separates the recording medium fed by the sheet feed roller 15 and supplies the recording medium into a sheet conveyance pathway 16, and multiple conveyance rollers 18 that convey the recording medium to the sheet conveyance pathway 16.

The sheet feeding unit 11 is configured to feed recording media accommodated in the sheet feeding cassettes 13 and 14 to a sheet conveyance pathway 19 that is provided in a printer main body 10.

The scanner unit 3, which is fixedly mounted on the printer main body 10, serves as an image reading device that reads an image formed on a document MS. The scanner unit 3 includes a moving unit 21 that includes a light source 21a, a reflection mirror 21b, an image reading sensor 21c such as a CCD (Charge Coupled Device). The moving unit 21 serves as a document reading unit that is freely movable in a sub-scanning direction, which is a horizontal (left-right) direction in FIG. 1, inside the scanner unit 3.

The ADF 4 includes a document conveying section 23 that includes rollers to automatically separate and feed the documents MS one by one form a document stack placed on a document tray 22 and convey the thus-fed document MS to a document reading area of the scanner unit 3. The document conveying section 23 is also configured to discharge the document MS after the image on the document MS has been read in the document reading area of the scanner unit 3 to a sheet discharging tray 24.

The scanner unit 3 also includes a slit glass 25 and a contact glass 26, both of which serve as the document reading areas. The slit glass 25 is short in the sub-scanning direction, which is a horizontal direction (i.e., a left-to-right direction) in FIG. 1, and long in the main scanning direction, which extends in an inward direction or a direction perpendicular to the horizontal direction toward the sheet face of FIG. 1. The contact glass 26 that is wider than the slit glass 25 in both the sub-scanning and main scanning directions.

In the scanning unit 21, when the document MS that is conveyed by the ADF 4 passes over the slit glass 25 that is the document reading area through which the image on the document MS is read, the light beam emitted by the light source 21a that is incorporated in the moving unit 21 are subsequently reflected on the surface of the document MS and received by the image reading sensor 21c via the reflection mirror 21b. By so doing, the image on the document MS can be read or scanned without moving the moving unit 21 that includes the light source 21a and the reflection mirror 21b.

On the other hand, when the document MS, which is a page of a book, for example, is placed on the contact glass 26 that is also the document reading area, the scanner unit 3 causes the moving unit 21 to move directly under the contact glass 26 from a standby position, which is on the left side as illustrated in FIG. 1, to the right side in FIG. 1 while emitting the light beam from the light source 21a of the moving unit 21 toward the document MS. After the light beam is reflected by the surface of the document MS placed on the contact glass 26, the reflected light beam passes through the reflection mirror 21b, and then is received by the image reading sensor 21c. With the above-described configuration, the document MS on the contact glass 26 can be read or scanned by the moving unit 21 in motion.

As described above, the image data of the document MS is read in the scanner unit 3 and is obtained by the image reading sensor 21c.

The printer main body 10 includes an optical writing unit 30, image forming units 31K, 31Y, 31M, and 31C, a transfer unit 33, a transfer unit 34, a pair of registration rollers 35, and a fixing device 36. The image forming units 31K, 31Y, 31M, and 31C include drum-shaped photoconductors 32K, 32Y, 32M, and 32C, respectively, to form respective toner images based on writing signals transmitted from the optical writing unit 30.

According to the image data obtained by the scanner unit 3, the optical writing unit 30 drives light sources such as laser diodes and LEDs that are disposed therein so as to emit respective laser light beams L toward the four photoconductors 32K, 32Y, 32M, and 32C, each of which serves as an electrostatic latent image.

This emission of the laser light beams L can form electrostatic latent images on respective surfaces of the photoconductors 32K, 32Y, 32M, and 32C, and then develop the electrostatic latent images into respective toner images through a predetermined development process. Suffixes "K", "Y", "M", and "C" provided to units or components such as the photoconductors 32K, 32Y, 32M, and 32C indicate that the units or components are for black, yellow, magenta, and cyan toners. The toners corresponding to respective colors include respectively colored resin materials, which melt and swell by fixing solution contained in the fixing device 36, which will be described later.

Each of the image forming units 31K, 31Y, 31M, and 31C supports the corresponding photoconductor 32 (32K, 32Y, 32M, and 32C), and units and components disposed around the photoconductor 32 as a single unit supported by a common supporting member and is detachably attachable to the printer main body 10 of the copier 1.

Each of the image forming units 31K, 31Y, 31M, and 31C further includes a developing unit and a drum cleaning unit. The developing unit develops an electrostatic latent image formed on each surface of the photoconductors 32K, 32Y, 32M, and 32C into respective color toner images through development, as described above. The drum cleaning unit cleans each of the photoconductors 32K, 32Y, 32M, and 32C by removing residual toner remaining on the surface of the photoconductors 32K, 32Y, 32M, and 32C.

The color toner images formed on the respective surfaces of the photoconductors 32K, 32Y, 32M, and 32C are transferred onto a surface of an intermediate transfer belt 39 as a composite color image. The composite color image is then conveyed through the conveyance pathway 19, and transferred onto the recording medium that is conveyed in synchronization with the pair of registration rollers 35.

Then, a relay belt 40 conveys the recording medium with the composite color image transferred from the intermediate transfer belt 39 thereon. After the composite color image is fixed to the recording medium by the fixing device 36, the recording medium is discharged via sheet discharging rollers 41 and 42 to a sheet discharging tray 43.

Figure 2:
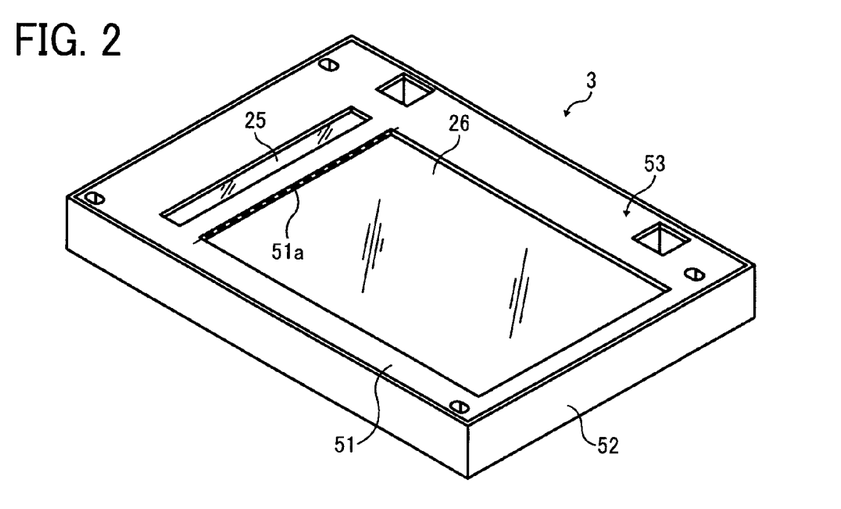
FIG. 2 is a perspective view of a scanner unit serving as an image reading device that can be attached to the copier of FIG. 1, according to Embodiment 1 of the present invention.
Figure 3:
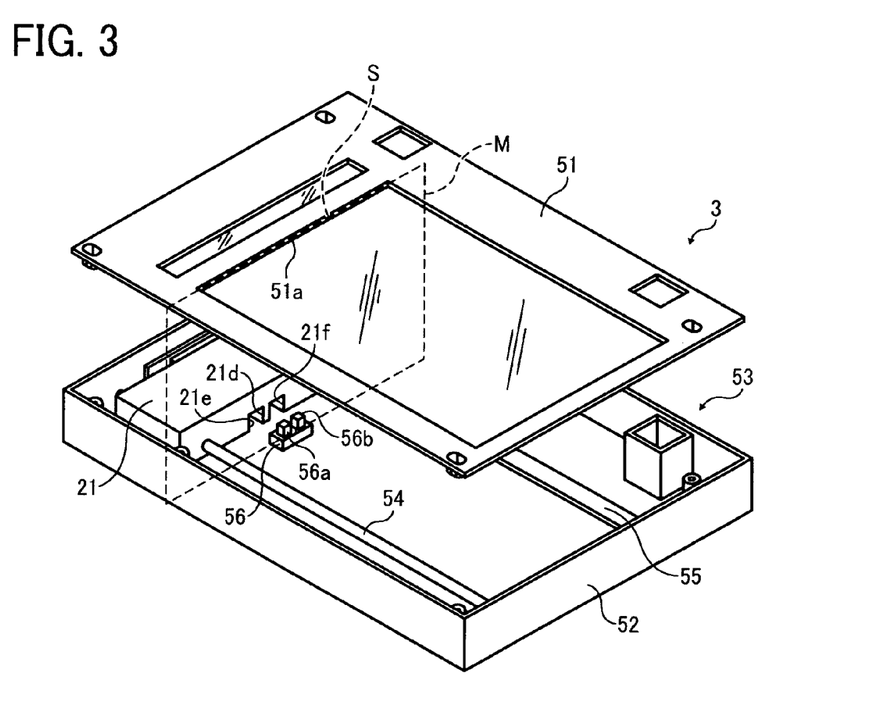
FIG. 3 is an exploded perspective view of a cover member and a moving body provided in the scanner unit of FIG. 2, according to Embodiment 1 of the present invention.
Figure 4:
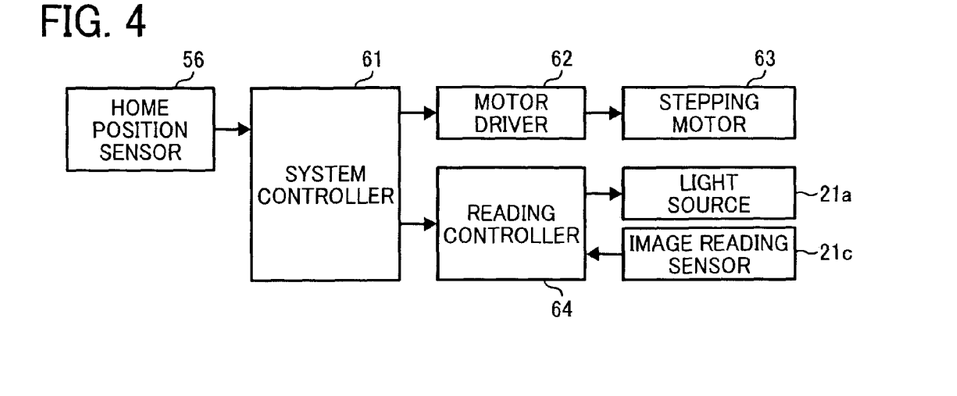
FIG. 4 is a block diagram illustrating a schematic configuration of a control system of the scanner unit according to Embodiment 1 of the present invention.

Next, a description is given of the configuration of the scanner unit 3 with reference to FIGS. 2 through 4.

As illustrated in FIGS. 2 and 3, the scanner unit 3 includes a scanner main body 53 that serves as a housing composed of a cover 51 that serves as a first housing member and a case 52 that serves as a second housing member. The cover 51 is mounted on the case 52, attached by screws on an upper circumferential surface of the case 52 of the scanner unit 3. In the present embodiment, both the cover 51 and the case 52 are made of the same resin material, such as ABS resin. However, the material of the cover 51 and the case 52 is not limited to ABS resin but can be some other resin material.

The scanner unit 3 further includes a guide rod 54 and a pair of parallel guide rails 55 (see FIG. 3).

The cover 51 includes the slit glass 25 and the contact glass 26, both of which are fixedly mounted thereon. At one end in a sub-scanning direction of the contact glass 26 of the cover 51, a document reference line 51a is formed against which the document MS contacts one end in the sub-scanning direction thereof, so that the document MS can be positioned in the sub-scanning direction on the contact glass 26 at the document reference line 51a (see FIG. 5). The document reference line 51a thus functions as a document positioning portion or a document positioner. The document reference line 51a has a slight gap projecting in a vertical direction with respect to the document reading areas.

The moving unit 21 is accommodated inside the scanner main body 53. The moving unit 21 is guided by the guide rod 54 and the pair of parallel guide rails 55, and is freely movable in the sub-scanning direction.

The guide rod 54 passes through one side in a main scanning direction of the moving unit 21 and extends across the case 52 in the sub-scanning direction.

The pair of parallel guide rails 55 are disposed extending across the case 52 in the sub-scanning direction at both ends in the main scanning direction of the moving unit 21 (one of the pair of parallel guide rails 55 is not illustrated in FIG. 3) so that the pair of parallel guide rails 55 can support the moving unit 21 moving thereon.

The case 52 also includes known components such as pulleys and wires used for the moving unit 21. These pulleys are driven by a stepping motor to move the moving unit 21 in the sub-scanning direction via the wires.

A home position sensor 56 serving as a reference position detector incorporating a photointerrupter is mounted on a bottom surface of the case 52. The home position sensor 56 includes a light emitting unit 56a and a light receiving unit 56b, facing each other. When the home position sensor 56 recognizes and determines the moving unit 21 itself and the position thereof by a process in which the light receiving unit 56b detects that the moving unit 21 blocks the light emitted from the light emitting unit 56b.

The moving unit 21 includes slits 21e and 21f that are formed at a lower portion thereof, extending in the sub-scanning direction of the moving unit 21 with a partition 21d formed therebetween. With this configuration, the moving unit 21 moves in the sub-scanning direction and passes over the home position sensor 56 along the slits 21e and 21f, so as to prevent the moving unit 21 from colliding with the home position sensor 56.

Then, when the light emitting unit 56a and the light receiving unit 56b are hidden by the slits 21e and 21f, respectively, the light emitted from the light emitting unit 56a toward the light receiving unit 56b is blocked by the partition 21d. Thus, the moving unit 21 and the position of the moving unit 21 can be detected.

The home position sensor 56 is mounted on the bottom surface of the case 52 such that the light emitting portion 56a and the light receiving portion 56b are located on a plane surface of a square M indicated by a broken line as illustrated in FIG. 3. Specifically, a part of one side of the plane surface of the square M corresponds to a reference main scanning line S extending along the document reference line 51a in the main scanning direction and the plane surface of the square M extends in a vertical direction so that the light emitting unit 56a and the light receiving unit 56b are positioned on the plane surface of the square M. This position is set as a reference position of the sub-scanning direction of the moving unit 21.

FIG. 4 illustrates a control system of the scanner unit 3. The control system of FIG. 4 includes a system controller 61, a home position sensor 56, a motor driver 62, and a reading controller 64. The system controller 61 includes a CPU (Central Processing Unit), a RAM (Random Access Memory), and a ROM (Read-Only Memory). It should be noted that the control system in FIG. 4 illustrates only control units or components that relate to the present invention.

The motor driver 62 drives a stepping motor 63 according to control signals transmitted from the system controller 61. The stepping motor 63 drives to rotate a pulley to move the moving unit 21 in the sub-scanning direction.

Further, the system controller 61 transmits the control signals to the reading controller 64. The reading controller 64 drives the light source 21a and the image reading sensor 21c provided to the moving unit 21 according to the control signals, so as to read the image data of the document MS.

Figure 5:
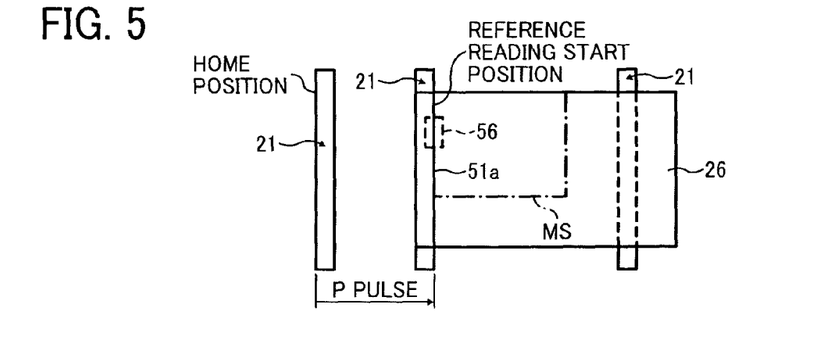
FIG. 5 is a diagram illustrating relative positions of a reading start position and a home position of the scanner unit, according to Embodiment 1 of the present invention.

Further, the system controller 61 starts reading the document MS when one side surface of the moving unit 21 in the sub-scanning direction, which is closer to the plane surface of the square M and has the entrances/exits of the slits 21e and 21f formed thereon, reaches directly under the position of the document reference line 51a in the vertical direction. Namely, the system controller 61 starts reading the document MS when the partition 21d passes between the light emitting unit 56a and the light receiving unit 56b. Specifically, as the one side surface of the moving unit 21 closer to the plane surface of the square M reaches directly under the document reference line 51a, the light emitting unit 56a and the light receiving unit 56b of the home position sensor 56 are inserted into the slits 21e and 21f, respectively, and therefore the light from the light emitting unit 56a is blocked by the partition 21d. At this time, the reading of the document MS is started. Accordingly, the position along the main scanning line S in the main scanning direction of the document reference line 51a is defined as a reference reading start position. As illustrated in FIG. 5, a home position of the moving unit 21 is set on the left side of the document reference line 51a. The home position is also a standby position of the moving unit 21.

The ROM or RAM of the system controller 61 stores the number of pulses of the stepping motor 63 from the home position to the home position sensor 56.

When the moving unit 21 moves from the left side to the right side of the scanner unit 3 and returns from the right side to the left side in FIG. 5, the home position sensor 56 detects the moving unit 21 and is then switched ON. When the moving unit 21 moves further to the left side and the home position sensor 56 is switched OFF, the system controller 61 then causes the stepping motor 63 to rotate by the number of pulses stored in the ROM or the RAM. With the above-described actions, the moving unit 21 is moved to the home position and put into a standby state.

For reading the document MS, the system controller 61 controls the reading controller 64 when the stepping motor 63 is driven only by the number of pulses (also referred to as "P pulses") that corresponds to a distance from a home position to a reference reading start position, specifically, a distance from the home position to a position directly under the document reference line 51a where the home position sensor 56 is located, and the system controller 61 emits light from the light source 21a mounted on the moving unit 21 to the document MS so as to start reading the image formed on the document MS.

In this embodiment, the home position sensor 56 detects the reference position of the moving unit 21 in the sub-scanning direction thereof, and the system controller 61 sets the reading start position of the document MS based on the detection results obtained by the home position sensor 56.

As described above, the scanner unit 3 of the copier 1 having the above-described configuration according to Embodiment 1 of the present invention forms the document reference line 51a to set a document to a reference position on the cover 51 and includes the home position sensor 56 mounted on the bottom surface of the case 52. The home position sensor 56 includes the light emitting unit 56a and the light receiving unit 56b that are located on the plane surface of the square M indicated by a broken line as illustrated in FIG. 3. A part of one side of the plane surface of the square M corresponds to the reference main scanning line S extending along the document reference line 51a in the main scanning direction and the plane surface of the square M extends in the vertical direction so that the light emitting unit 56a and the light receiving unit 56b are positioned on the plane surface of the square M. Therefore, the light emitting unit 56a and the light receiving unit 56b of the home position sensor 56 can be positioned directly below the document reference line 51a in the vertical direction.

Consequently, even when the cover 51 and the case 52 are affected by thermal expansion or contraction caused by heat generated by a heat source in the copier 1, for example, the fixing device 36, the configuration according to this embodiment of the present invention can prevent relative positional variations between the document reference line 51a and the home position sensor 56 in the sub-scanning direction.

With this configuration, the home position sensor 56 can detect the correct position of the moving unit 21, and therefore the positional shift of the reading start position of the document MS from the document reference line 51a can be prevented based on the reference position of the moving unit 21 in the sub-scanning direction detected by the home position sensor 56, thereby preventing the deviation or positional shift of the reading start position of an image of the document MS. As a result, the image formed on the document MS can be read highly accurately, and therefore a highly accurate image can be formed on a recording medium.

Specifically, in this embodiment, the cover 51 and the case 52 are made of the same material. Therefore, the thermal expansion or contraction of the cover 51 and the case 52 caused by temperature change in the scanning unit 3 or the copier 1 can be substantially equal for both parts and thus the amount of change of the position of the document reference line 51a and the amount of change of the position of the home position sensor 56 in the sub-scanning direction can also be substantially equal. Consequently, changes in the relative positions of the document reference line 51a and the home position sensor 56 in the sub-scanning direction can be further prevented.

Figure 6:
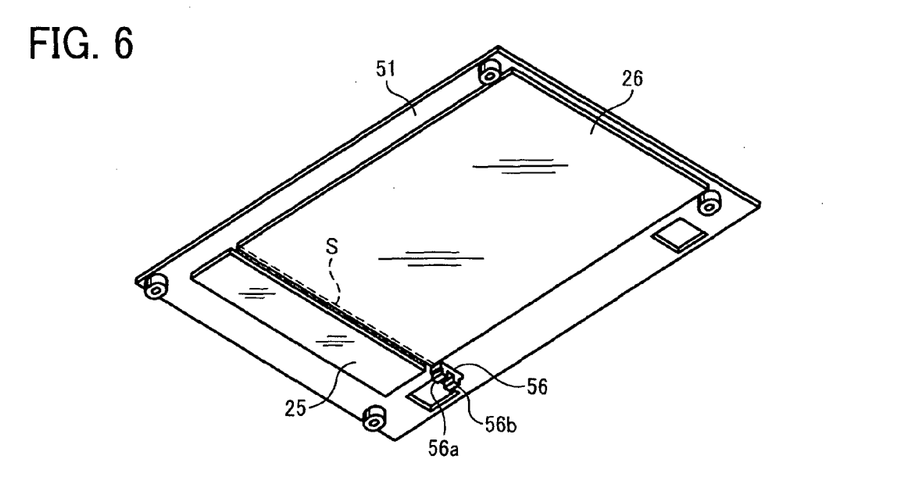
FIG. 6 is a perspective view illustrating a reverse side of a variation of the cover member shown in FIG. 3.

In this embodiment, the home position sensor 56 is mounted on the bottom plate of the case 52. However, the position of the home position sensor 56 is not limited thereto. For example, as illustrated in FIG. 6, the home position sensor 56 can be mounted on the back side of the cover 51 that is disposed facing the bottom surface of the case 52 such that the light emitting unit 56a and the light receiving unit 56b are located on the plane surface of the square M as illustrated in FIG. 3, where a part of one side of the plane surface of the square M corresponds to the reference main scanning line S extending along the document reference line 51a in the main scanning direction and the plane surface of the square M extends in the vertical direction so that the light emitting unit 56a and the light receiving unit 56b are positioned on the plane surface of the square M.

With this configuration, the amount of thermal expansion or contraction of the document reference line 51a in the sub-scanning direction can be equal to the amount of thermal expansion or contraction of the home position sensor 56 in the sub-scanning direction, thereby preventing the change in relative positions of the document reference line 51a and the home position sensor 56 in the sub-scanning direction of the main body 53 of the scanner unit 3.

Further, with this configuration, even if the cover 51 and the case 52 are made of materials having different coefficients of linear expansion or contraction, the changes in the relative positions of the document reference line 51a and the home position sensor 56 in the sub-scanning direction can be prevented.

[Embodiment 2]

Figure 7:
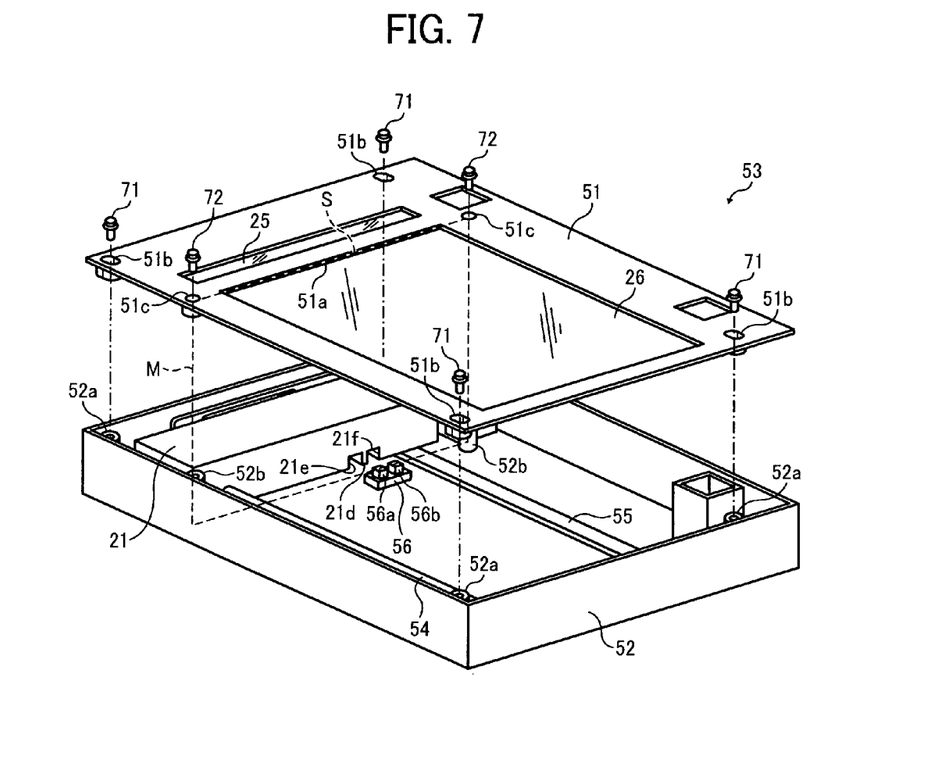
FIG. 7 is an exploded perspective view of a cover member and a moving body provided in a scanner unit, according to Embodiment 2 of the present invention.
Figure 8:
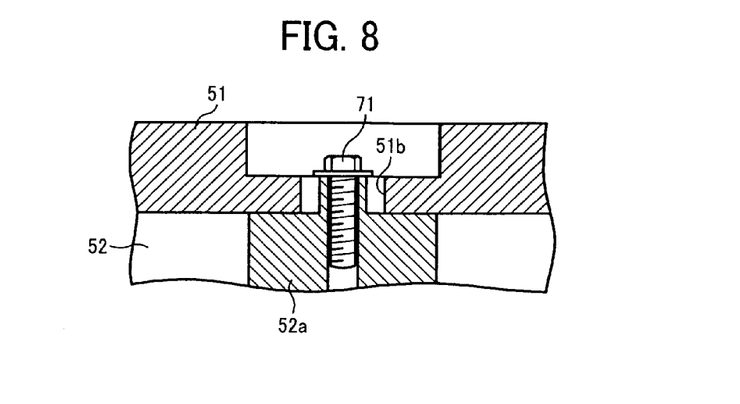
FIG. 8 is a cross-sectional view of a modified allowance member, according to Embodiment 2 of the present invention.

FIGS. 7 and 8 illustrate schematic configurations of an image reading device (i.e., the scanner unit 3) and an electrophotographic image forming apparatus (i.e., the copier 1) according to Embodiment 2 of the present invention. The descriptions are given of the image forming apparatus (the copier 1) including the image reading device (the scanner unit 3) according to Embodiment 2 of the present invention. Elements or components of the copier 1 serving as an image forming apparatus according to Embodiment 2 may be denoted by the same reference numerals as those of the copier 1 according to Embodiment 1 and the descriptions thereof are omitted or summarized.

In FIGS. 7 and 8, slots 51b are formed at all corners of the cover 51 and screw thread portions 52a are formed at all corners of the case 52 to face the respective slots 51b. Bolts 71 are screwed with the respective screw thread portions 52a through the respective slots 51b.

Further, each slot 51b is formed to have the width in the main scanning direction substantially equal to the diameter of each bolt 71 and the length in the sub-scanning direction greater than the diameter of the bolt 71. Therefore, specific areas about the slots 51b on the cover 51, where the cover 51 and the case 52 are fixed by the respective bolts 71 with the screw thread portions 52a through the slots 51b, are expandable and contractible in the sub-scanning direction with respect to the case 52, and the respective bolts 71 can be movable within the length of the slots 51b along the inner line thereof In this embodiment, the slots 51b, the screw thread portions 52a, and the bolts 71 form a shiftable housing fixing unit.

Further, circular holes 51c are formed at both sides of the main scanning line S of the document reference line 51a of the cover 51 in the main scanning direction, and screw thread portions 52b are formed on the case 52, facing the respective circular holes 51c formed on the cover 51.

Bolts 72 are screwed with the respective screw thread portions 52b through the respective circular holes 51c. Each of the circular holes 51c is formed on the cover 51 to have the width that is substantially same as the diameter of the bolt 21, and therefore is not freely movable in the sub-scanning direction along the respective blots 72. Therefore, specific areas about the circular holes 51c on the cover 51, where the cover 51 and the case 52 are fixed by the respective bolts 72 with the screw thread portions 52b through the circular holes 51c, are fixed with respect to the case 52 so as not to expand and contract in the sub-scanning direction with respect to the case 52, and the respective bolts 72 cannot be move.

In this embodiment, two of the slots 51b that are formed on the cover 51 in the vicinity of the circular holes 51c are spaced from the circular holes 51c in the sub-scanning direction. Further, the circular holes 51c, the screw thread portions 52b, and the bolts 72 form a housing fixing unit.

As described above, the scanner unit 3 of the copier 1 having the above-described configuration according to Embodiment 2 of the present invention includes the circular holes 51c, the screw thread portions 52b, and the bolts 72 to fix the cover 51 and the case 52 onto the main scanning S in the main scanning direction of the document reference line 51a. Therefore, when the cover 51 and the case 52 undergo thermal expansion or contraction caused by heat generated by a heating device such as the fixing device 36, the thermal expansion or contraction starts from the housing fixing unit including the bolts 72, that is, from the document reference line 51a and the home position sensor 56, thereby further preventing the changes in relative positions of the document reference line 51a and the home position sensor 56 in the sub-scanning direction of the scanner unit 3.

Further, in this embodiment, the coefficient in linear expansion of the cover 51 is different from the coefficient in linear expansion of the contact glass 26 having a large image reading area, and therefore the difference of the amounts of thermal expansion or contraction between the cover 51 and the case 52 is concerned. However, as described above, when the cover 51 and the case 52 undergo the thermal expansion or contraction caused by heat generated by a heating device such as the fixing device 36, the thermal expansion or contraction may start from the document reference line 51a and the home position sensor 56, thereby further preventing the relative positional shifts or changes of the document reference line 51a and the home position sensor 56 in the sub-scanning direction of the scanner unit 3.

Further, in this embodiment, the cover 51 and the case 52 may undergo thermal expansion or contraction starting from the housing fixing unit including the bolts 72. Therefore, even if the coefficient in linear expansion of the cover 51 is different from the coefficient in linear expansion of the case 52, the changes in relative positions of the document reference line 51a and the home position sensor 56 in the sub-scanning direction of the scanner unit 3 can be prevented.

Further, in this embodiment, the shiftable housing fixing unit including the slots 51b, two of which are formed in the vicinity of the circular holes 51c, is spaced from the housing fixing unit including the circular holes 51c in the sub-scanning direction of the scanner main body 53 of the scanner unit 3 and is provided to fix the cover 51 and the case 52 so as to allow the cover 51 and the case 52 to vary in the sub-scanning direction of the scanner main body 53. Therefore, when the cover 51 and the case 52 undergo thermal expansion or contraction starting from the housing fixing unit including the bolts 72, the positions of the cover 51 and the case 52 are allowed to change in the sub-scanning direction of the scanner main body 53 of the scanning unit 3, thereby preventing occurrence of deformation (e.g., warp and/or distortion) to the cover 51 and the case 52.

In the above-described embodiments, the scanner main body 53 is formed by two components, which are the cover 51 and the case 52, but the configuration of the scanner main body 53 is not limited thereto. For example, the scanner main body 53 can be formed by three or more components.

The above-described embodiments are illustrative and do not limit the present invention. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:
1. An image reading device, comprising:
  a housing including a planar first housing member having a document reading area on which a document is placed and a rectangular second housing member attached to the first housing member;
  a document reference line formed on the first housing member to position the document placed on the document reading area in a sub-scanning direction of the housing;
  a document reading unit disposed inside the housing, a bottom portion of the document reading unit including two slits with a partition formed therebetween, the document reading unit configured to start reading the document, through the document reading area while moving in a sub-scanning direction of the housing, based on a start signal indicating that the document reading unit is positioned at the document reference line;
  a reference position detector including a light receiving portion configured to receive light emitted from a light emitting portion, the reference position detector positioned on a plane surface of a square that extends perpendicular to the document reading area along a main scanning direction of the document reference line such that when the document reading unit is positioned at the document reference line, the partition blocks the emitted light from being received at the light receiving portion to detect that the document reading unit is positioned at the document reference line; and
  a controller configured to transmit the start signal to the document reading unit, if the reference position detector detects that the document reading unit is positioned at the document reference line.

2. The image reading device according to claim 1, further comprising:
  a first fixing unit to fix the first housing member and the second housing member in the main scanning direction of the document reference line.

3. The image reading device according to claim 2, further comprising a second fixing unit disposed a predetermined distance from the first fixing unit in the sub-scanning direction,
  wherein the second fixing unit fixes the first housing member and the second housing member to allow the first housing member and the second housing member to deform in the sub-scanning direction.

4. The image reading device according to claim 2, wherein the first fixing unit includes a bolt, an elongated slot on the first housing member and a threaded screw portion on the second housing member, and wherein the elongated slot is wider than the bolt such that the bolt can move within a length of the elongated slot.

5. The image reading device according to claim 3, wherein the second fixing unit is positioned at the document reference line.

6. The image reading device according to claim 5, wherein the second fixing unit includes a bolt, a circular hole on the first housing member and a threaded screw portion on the second housing member, and wherein the circular hole is configured such that the bolt cannot move along the sub-scanning direction within the circular hole such that any deformation of the housing does not change a relative position between the document reference line and the reference position detector.

7. The image reading device according to claim 1, wherein the reference position detector is mounted on the second housing member.

8. The image reading device according to claim 1, wherein the reference position detector is mounted on the first housing member.

9. The image reading device according to claim 1, wherein the first housing member and the second housing member are made of the same material.

10. An image forming apparatus, comprising:
    the image reading device according to claim 1; and
    an image forming unit to form the image read by the image reading device on a recording medium.

11. The image reading device according to claim 1, wherein the controller is configured to set a standby position of the document reading unit at one end of the document reference line.

\* \* \* \* \*